United States Patent [19]
Topar

[11] Patent Number: 5,588,557
[45] Date of Patent: Dec. 31, 1996

[54] BEVERAGE DISPENSER

[76] Inventor: William M. Topar, 4664 W. Puget, Glendale, Ariz. 85302

[21] Appl. No.: 446,565

[22] Filed: May 19, 1995

[51] Int. Cl.$^6$ ....................................................... B67D 5/08
[52] U.S. Cl. .......................... 222/54; 222/57; 222/129.1; 222/134; 222/145.7; 222/641
[58] Field of Search .......................... 222/54, 57, 129.1, 222/132, 134, 145.7, 640, 641

[56] References Cited

U.S. PATENT DOCUMENTS

| | | | |
|---|---|---|---|
| 2,750,073 | 6/1956 | Coffman, Jr. | 222/57 |
| 3,084,613 | 4/1963 | Maxson | 99/275 |
| 4,493,249 | 12/1987 | Layre et al. | 99/289 |
| 4,709,625 | 1/1985 | Stover | 99/275 |
| 4,886,190 | 12/1989 | Kirschner et al. | 222/57 |
| 5,381,926 | 1/1995 | Credle, Jr. et al. | 222/145.7 X |

OTHER PUBLICATIONS

Coffee-Mat Corporation -Model No. CCST-8-872-N.

*Primary Examiner*—Gregory L. Huson
*Attorney, Agent, or Firm*—Warren F. B. Lindsley

[57] ABSTRACT

A beverage dispenser is disclosed which controls of the delivery and mix of a liquid from its source with an ingredient. The dispenser comprises a mixer which mixes the liquid and the ingredient, the mixer being in electrical isolation from the source of the liquid. The liquid is delivered from the source to the mixer thereby providing electrical continuity between the source and the mixer. A sensor in electrical communication with a control board detects the electrical continuity between the source and the mixer. The ingredient is delivered to the mixer upon activation by the control board after the sensor detects the electrical continuity.

10 Claims, 5 Drawing Sheets

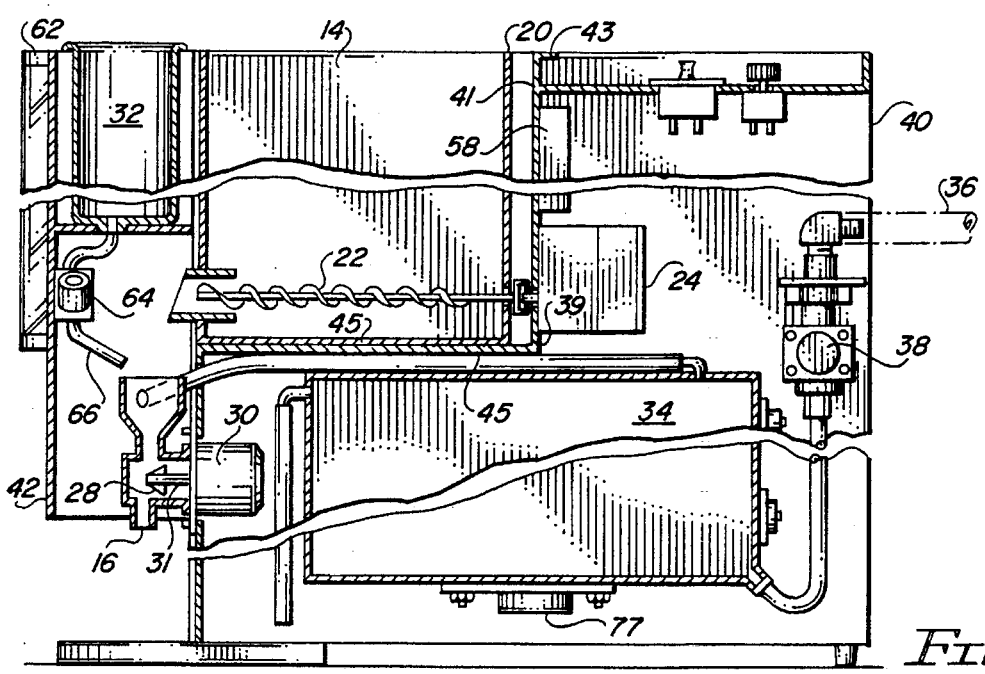
FIG-3
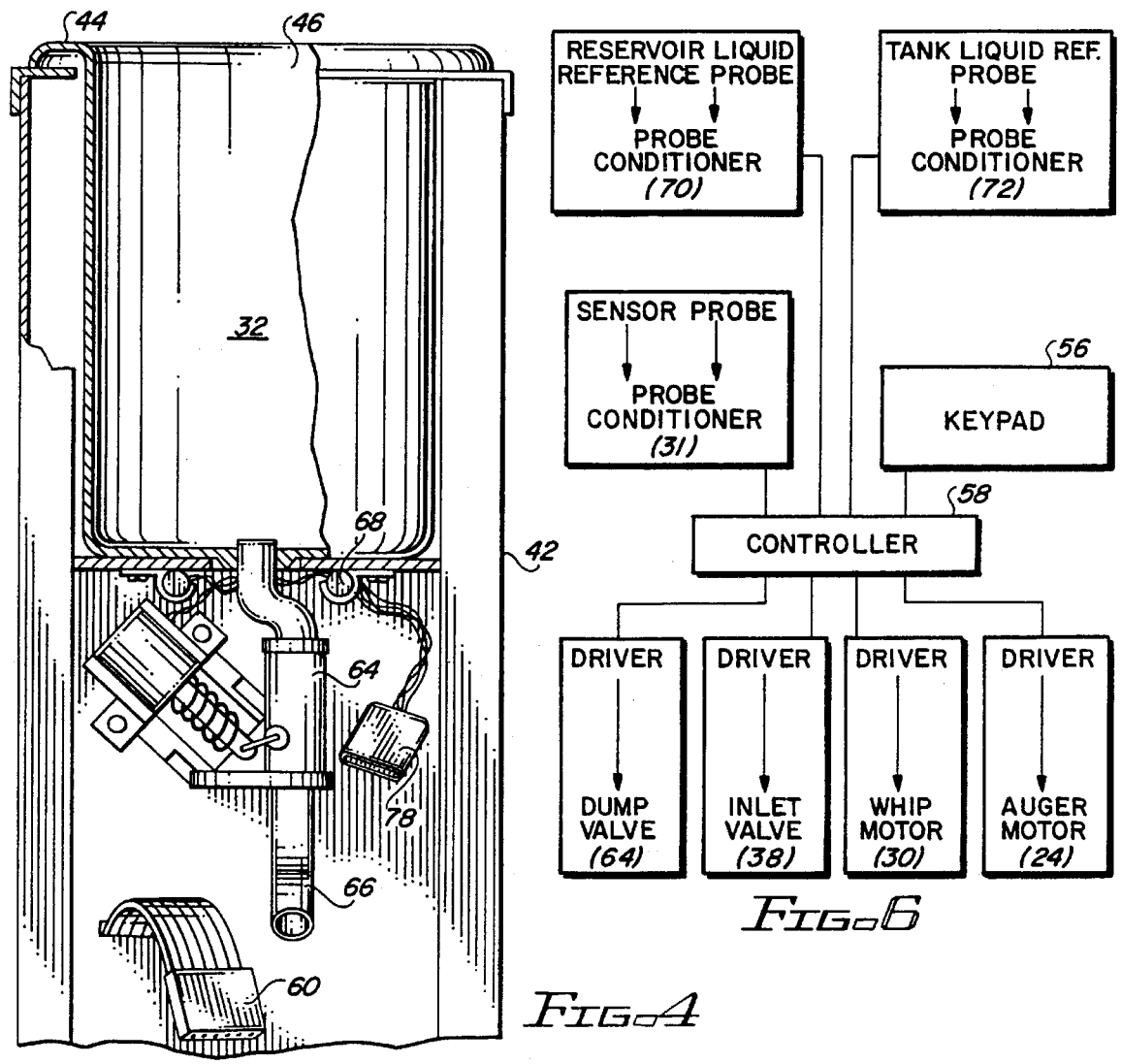
FIG-4
FIG-6

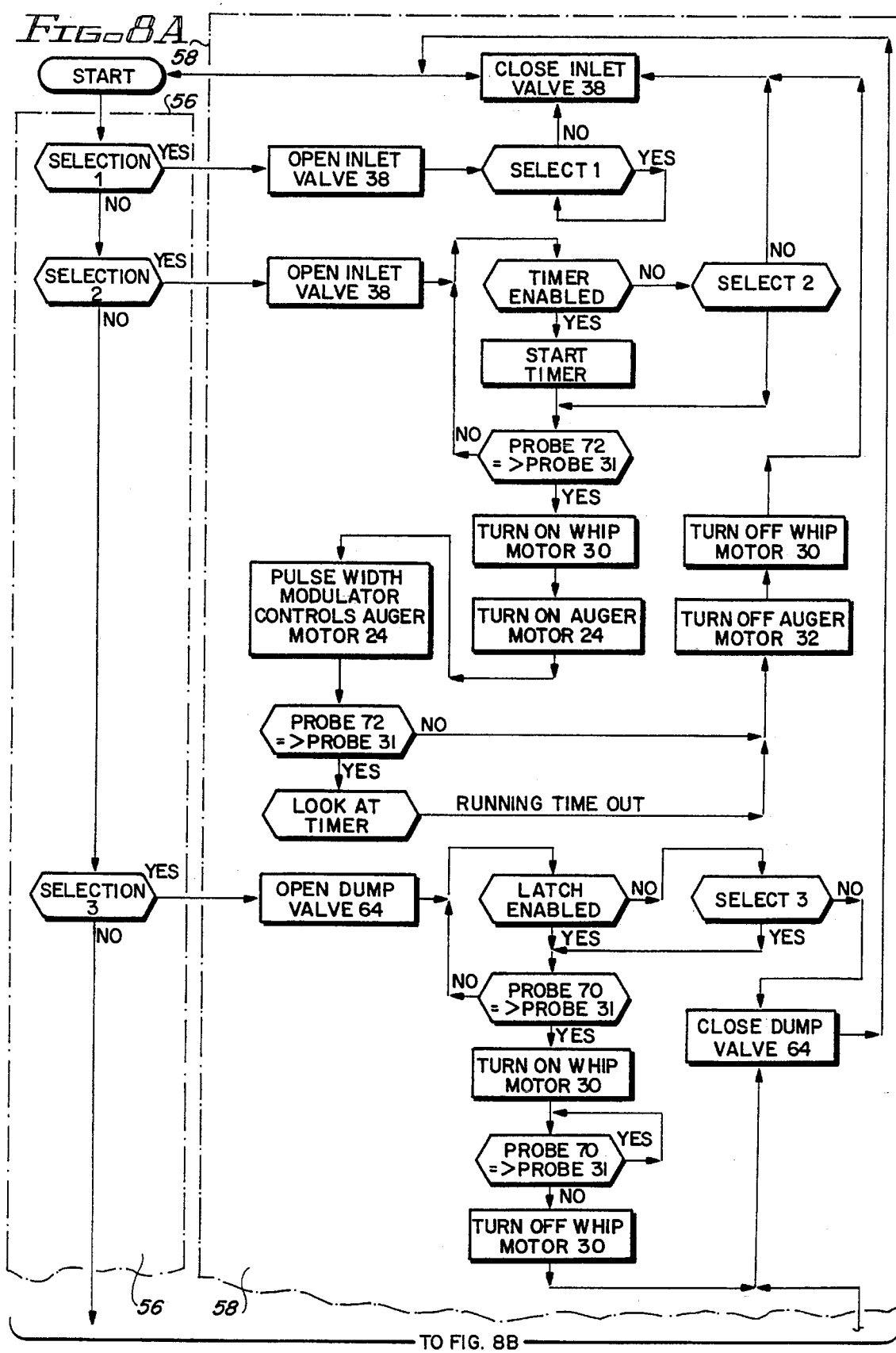

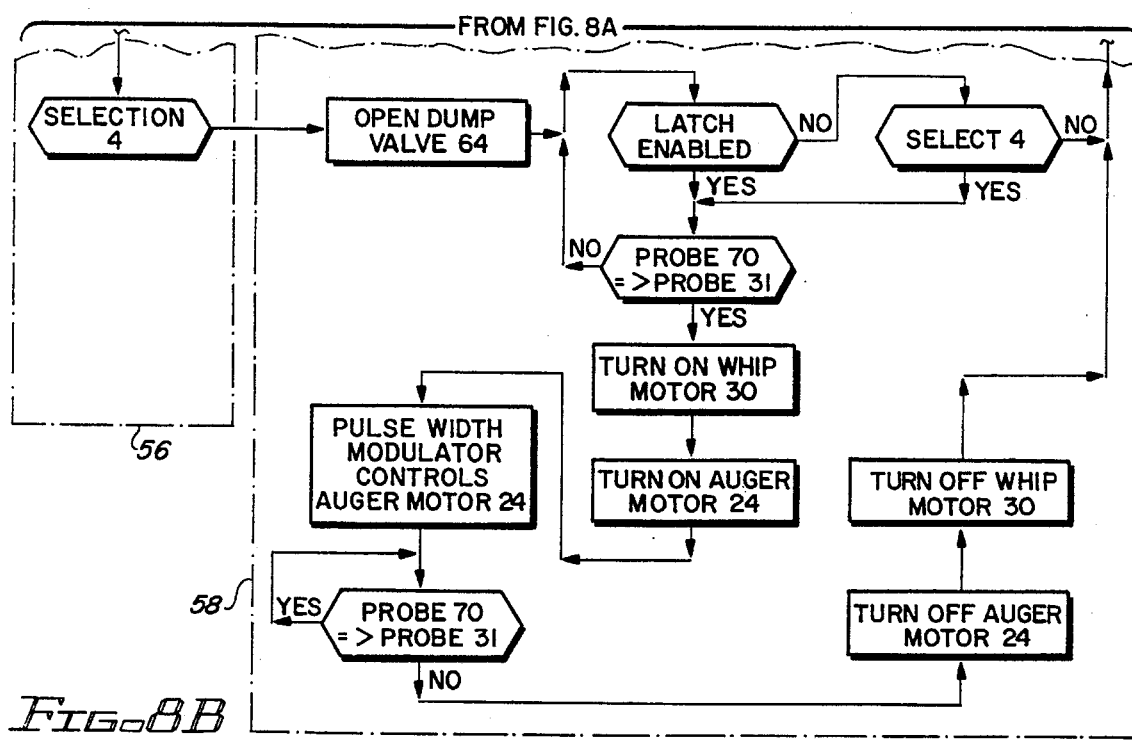

5,588,557

BEVERAGE DISPENSER

BACKGROUND OF THE INVENTION

This invention relates to a beverage dispenser which automatically blends a liquid and an ingredient and, more particularly, to one which utilizes the conductive capacity of the liquid to control the delivery and mix of the liquid with the ingredient.

The control of the delivery and mix of the liquid and an ingredient has been a major concern for beverage dispenser manufacturers. At present, most such dispensers control the delivery and mix by carefully timing the delivery means to provide the correct amount of each material at the correct time.

DESCRIPTION OF THE PRIOR ART

U.S. Pat. No. 3,084,613 discloses a timer being used to control the period in which heated water and beverage powder are fed into a premixing chamber.

U.S. Pat. No. 4,493,249 shows an auger used to drive instant coffee into a mixing receptacle.

U.S. Pat. No. 4,709,625 discloses an auger used to dispense chopped tea leaves into a brew cavity.

The Coffee-Mat Corporation of Kenilworth, N.J., manufactures a Model CCST-8-872-N hot coffee dispenser which discloses the use of a two probe sensor system to prevent the dispensing of sugar and/or coffee lightener in the event that the coffee liquid does not reach the mixing bowl. The device does not control the amount of sugar or coffee lightener dispensed; it merely acts as a on/off control.

None of these devices disclose a device which automatically controls the dispensing of a liquid and an ingredient by use of the conductive nature of the flowing liquid.

SUMMARY OF THE INVENTION

In accordance with the invention claimed, one object of this invention is to provide a new beverage dispensor for automatically delivering and mixing a liquid and an ingredient by using the conductive nature of a flowing liquid.

It is another object of this invention to provide for control of the amount of an ingredient dispensed for the appropriate liquid.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings, in which:

FIG. 3 is a cross-sectional view of FIG. 2 taken along line 3—3;

FIG. 4 is a cross-sectional view of FIG. 2;

FIG. 6 is a schematic showing the operation of one embodiment of the present invention;

FIGS. 8A and 8B are drawings illustrating a flow diagram of the invention disclosed.

DESCRIPTION OF THE PREFERRED EMBODIMENT

In accordance with the invention claimed, FIGS. 1–8B disclose a beverage dispenser 10 which dispenses a beverage from a nozzle 16, the beverage being a blend of a liquid 12 and another ingredient 14.

Figure 5:
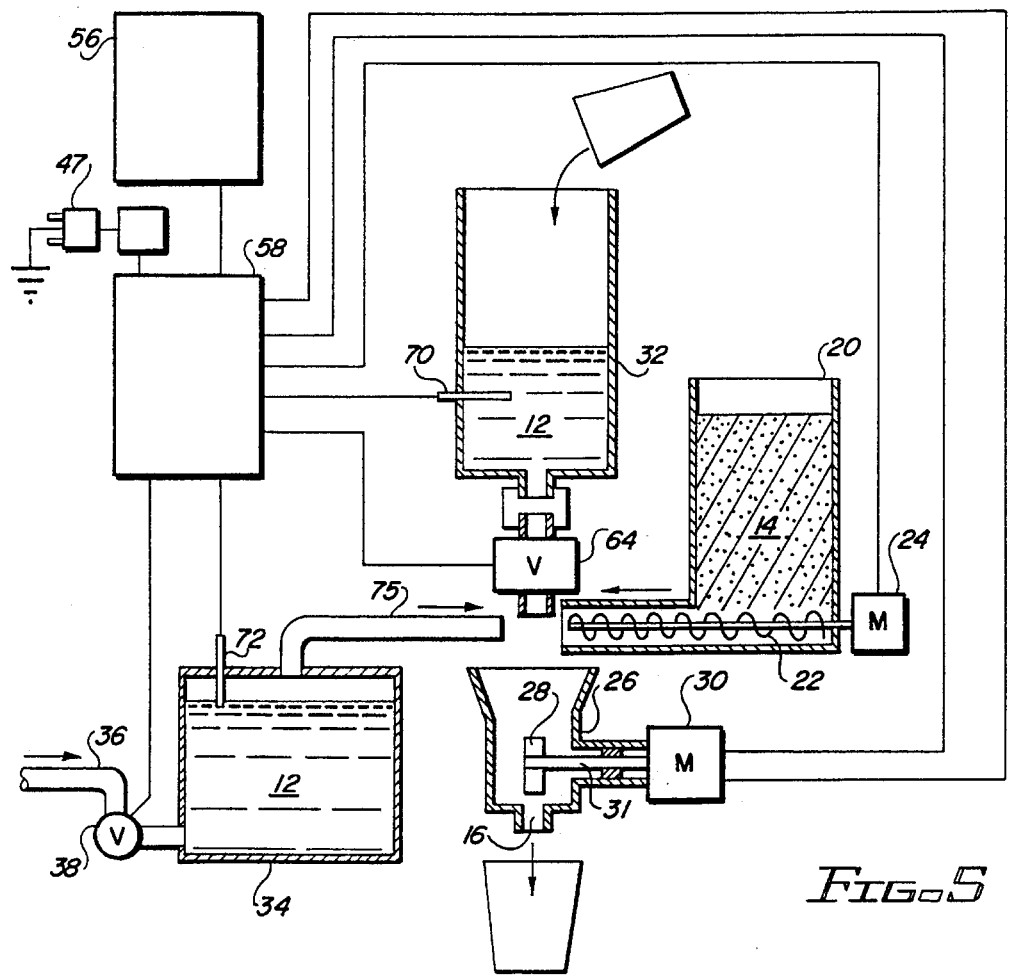
FIG. 5 is a schematic showing the operation of the present invention.

Referring now to FIG. 3 and the schematic of FIG. 5, ingredient 14 is stored in a canister 20. Positioned at the bottom of ingredient canister 20 is an auger 22 driven by auger motor 24 which delivers ingredient 14 into a mixer, preferably a mixing funnel 26.

Simultaneously, liquid 12 is also delivered to mixing funnel 26 from a source. A whipping blade 28 located in mixing funnel 26 is driven by a whip motor 30 and thoroughly disperses ingredient 14 into liquid 12 thus forming the beverage which is dispensed from nozzle 16 mounted above a drip pan 18 seen in FIGS. 1 and 2.

Liquid 12 can be hot water and ingredient 14 can be a solid comprising fine particles such as cocoa powder or coffee granules. However, other suitable materials, both liquid and solid, will be apparent to those skilled in the art.

In the preferred embodiment, a user has the option of providing liquid 12 via a pour in reservoir 32 or automatically via tank 34. As the name suggests, pour in reservoir 32 is filled by a user who pours in liquid. In contrast, tank 34 receives its liquid from an inlet source 36 such as a tap water through inlet valve 38.

To control the delivery and mixing of liquid 12 and ingredient 14, the present invention uses flowing liquid 12 which creates a conductive connection between the mixing funnel 26 and either the reservoir 32 or the tank 34. The electrical continuity triggers the start of auger motor 24 and whip motor 30 and, upon termination, stops motor 24 and whip motor 30.

The electrical circuit in its open condition is either the reservoir 32 or tank 34 being grounded and electrically isolated from a sensor probe 31 but in electrical communication with a control board 58. In the preferred embodiment sensor probe 31 is the whip motor shaft. As discussed in more detail below, when liquid 12 is flowing from either reservoir 32 or tank 34 to probe 31, the flowing conductive liquid creates electrical continuity between the probe 31 and either the reservoir or the tank.

One embodiment structurally illustrated in FIGS. 1–4 includes a housing 40, a front door 42 pivotally mounted to housing 40, and a removable top cover 44 which extends over both housing 40 and front door 42. Pour in reservoir 34 is mounted within front door 42 proximate to the top cover 44.

Top cover 44 includes an opening 46 located in the portion of cover 44 corresponding to front door 42. Opening 46 extends completely through top cover 44 to provide liquid communication between the exterior of dispenser 10 and pour in reservoir 32. Preferably, a chain 48 is provided which secures a lid 50 to top cover 44.

In addition, a pop up safety switch 47 is mounted on top of housing 40. Safety switch 47 cooperates with top cover 44 to cut off the electrical power to dispenser 10 when top cover 44 is removed.

Mounted in housing 40 proximate to reservoir 32 is an L-shaped structure 39 including a rear wall 43 and a bottom 45 which defines a bay 41. Preferably, ingredient canister 20 is removably slid into bay 41 and rests upon bottom 45.

Auger motor 24 is mounted on rear wall 43 opposite bay 41 whereby auger 22 extends through canister 20 and auger motor 24 drive shaft extends through wall 43 to connect to auger 22. In the preferred embodiment, control board 58 is mounted to rear wall 43 above auger motor 24.

In this embodiment, housing 40 is a tower-like configuration which is 5 inches wide, 12½ inches deep and 24 inches tall. The narrow footprint allows easy placement of dispenser 10 in tight spaces on counter tops and the like. In addition, the drop forward front door 42 on hinges 54 allows for multiple dispensers to be placed side by side. In the event added lateral stability is desired, a flat plate 52 can be bolted to the bottom of housing 40. Flat plate 52 provides the added lateral stability while still allowing other appliances to be placed thereon to conserve space.

Figure 2:
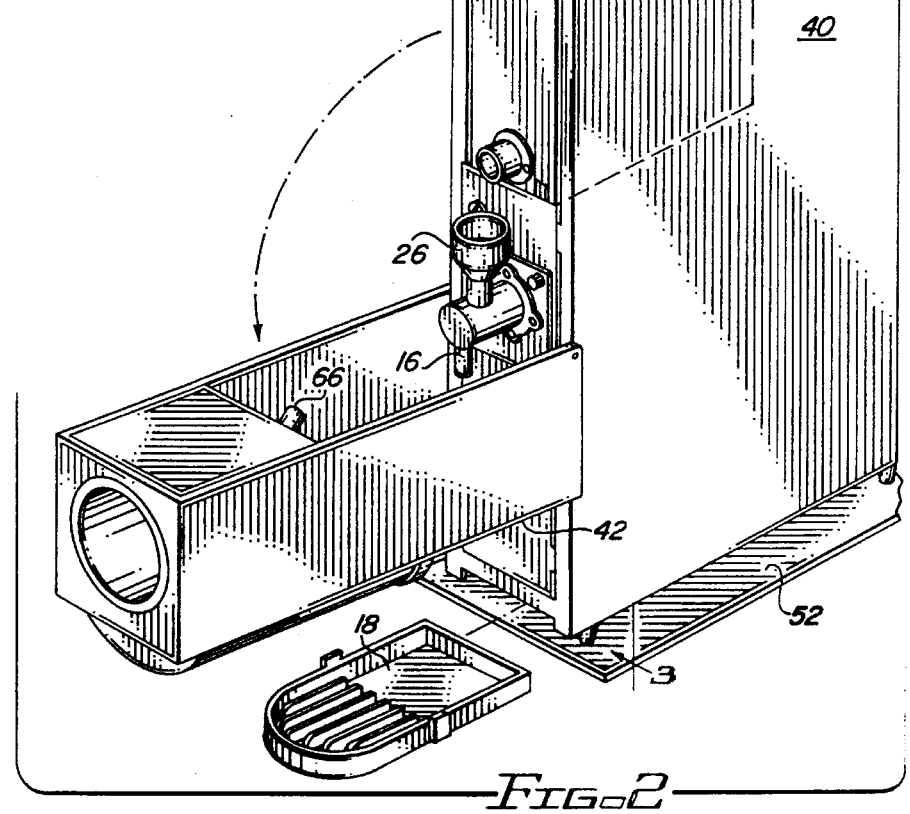
FIG. 2 is a partially exploded perspective view of the embodiment of FIG. 1 having a front door open.

As best seen in FIGS. 2 and 4, front door 42 is pivotally mounted via hinges 54 to housing 40. In the preferred embodiment, a touch pad 56 having indicia thereon is mounted on the lower front of front door 42. Touch pad and/or keypad 56 provides the user with control of the operation of the dispenser 10. Keypad 56 is connected to control board 58 via ribbon cable 60 seen in FIG. 4.

Figure 1:
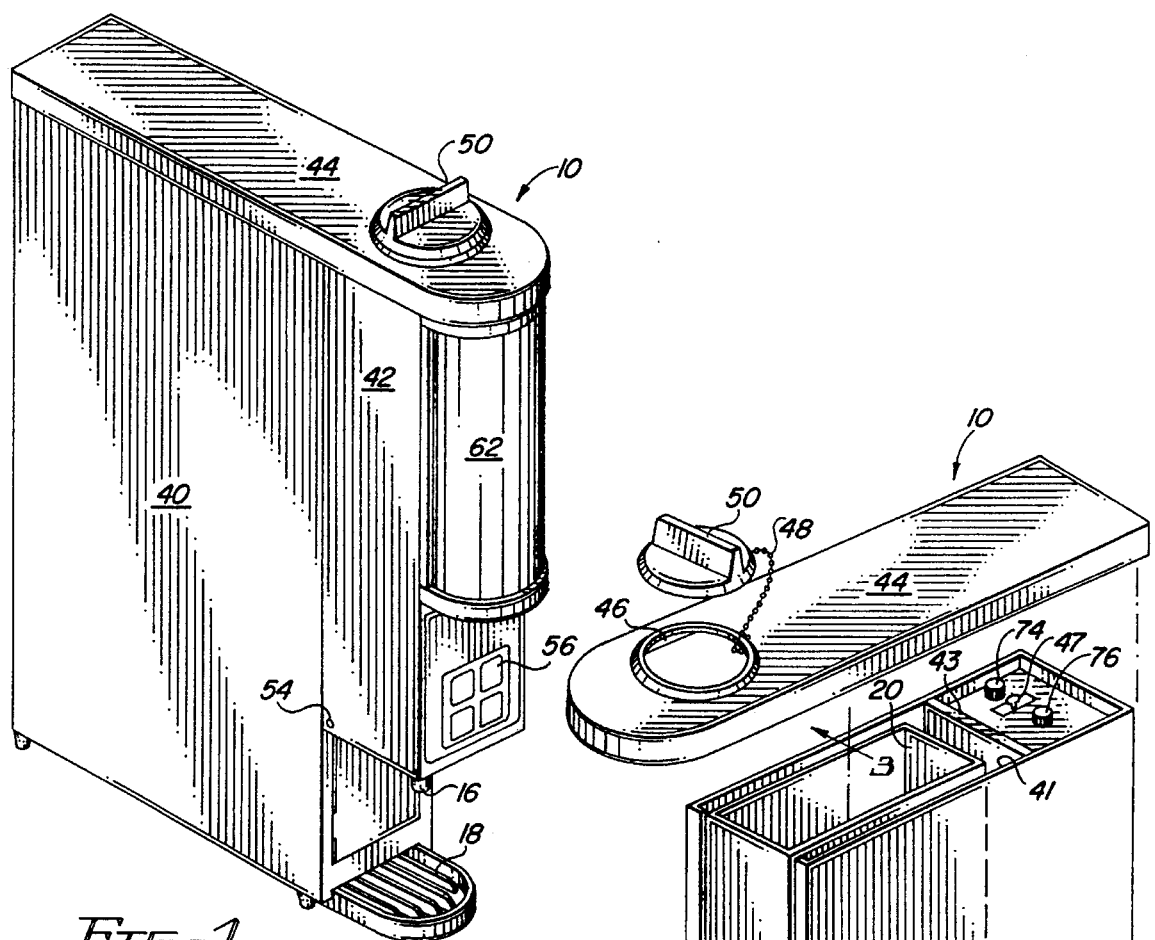
FIG. 1 is a perspective view of a beverage dispenser being one embodiment of the present invention.
Figure 7:
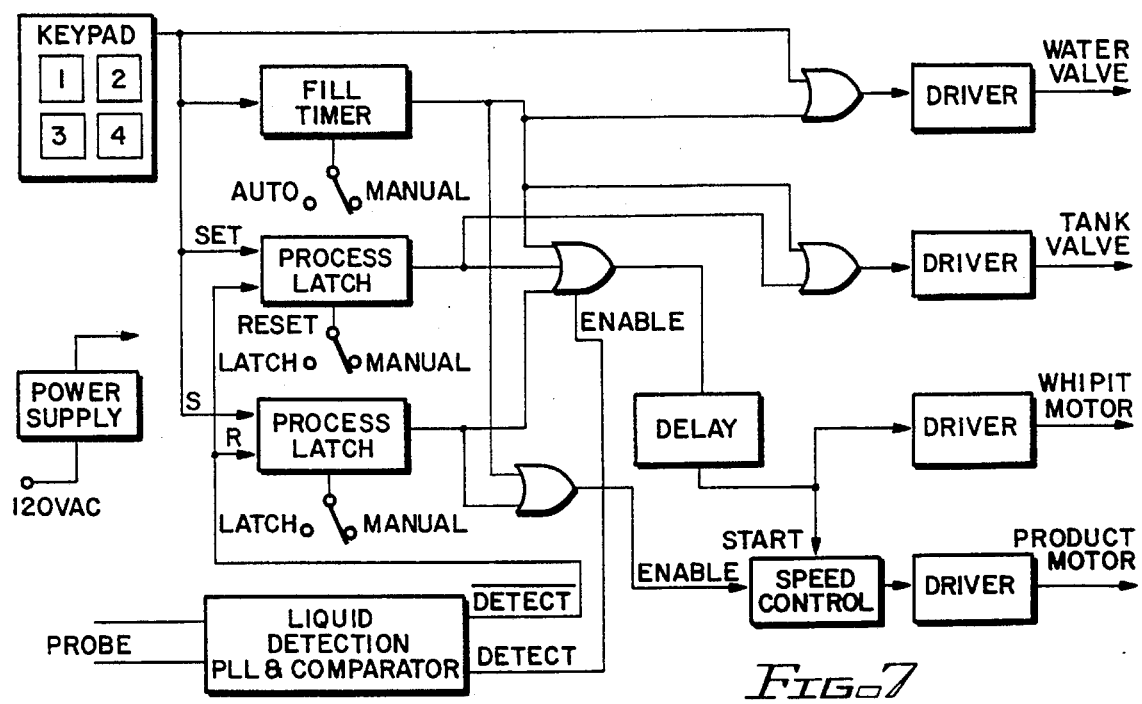
FIG. 7 is a flowchart illustrating a control board used in one embodiment of the present invention.

In one embodiment best seen in FIGS. 1 and 7, keypad 56 includes four selections. The first selection is for dispensing hot water alone from tank 34 while the second delivers beverage by mixing liquid 12 from tank 34 with ingredient 14 from canister 20. The third option whips liquid 12 from pour in reservoir 32 while the fourth delivers beverage by mixing liquid 12 from reservoir 32 with ingredient 14 from canister 20.

The upper front portion of front door 42 preferably includes a semi-cylindrical display 62 which includes indicia describing the product available. The display 62 illustrated in the drawings is back-lit and translucent.

Dispenser 10 operates in the pour in mode when liquid 12 is gravity fed from reservoir 32 via a dump valve 64 and hence to a spout 66 which directs liquid 12 into mixing funnel 26. To avoid heat loss when hot liquid is poured into a cold metal reservoir, heating cartridges 68 are mounted to the bottom of reservoir 32.

In the preferred embodiment as best seen in FIG. 5 and in the schematic of FIG. 6, a liquid reference probe 70 is mounted to extend into reservoir 32 and contact liquid 12 contained therein. Probe 70 senses the temperature and conductive capacity of liquid 12 contained therein. Probe 70, dump valve 64, display 62 and heating cartridges 68 are electrically connected to control board 58 by ribbon 78 seen in FIG. 4.

To use the pour in feature, a user pours liquid 12 into reservoir 32. As best illustrated in FIGS. 6, 7, 8A and 8B, using keypad 56, the user selects either selection three or four which selection is relayed to control board 58. Control board 58 in turn opens dump valve 64 thereby releasing liquid 12 from reservoir 32.

Control board 58 latches dump valve 64 open for a preselected period of time, preferably about three seconds, to make certain that liquid reaches mixing funnel 26. Alternatively, control board 58 can be set to have dump valve 64 held open manually via continued depression of the appropriate keypad selection until control board 58 senses the liquid at funnel 26.

At the same time dump valve 64 opens, probe 70 senses the temperature and electrical conductivity of liquid 12 and relays that information to control board 58. Using the information from probe 70, board 58 conditions the conductive sensitivity of sensor probe 31 located in mixing funnel 26. Once liquid 12 is in contact with both conditioned sensor probe 31 and reservoir 32, the control board 58 determines that continuity exists between the reservoir 32 and probe 31.

The continuity of the circuit signals control board 58 which energizes whip motor 30 (for selections 3 and 4) and auger motor 24 (for selection 4 only). Auger motor 24 drives auger 22 and thus delivers ingredient 14 from canister 20 to mixing funnel 26.

The amount of ingredient 14 which is added is determined by the volume of liquid passing through and the number of turns of the auger 22. To vary the amount, a pulse width modulator is included in control board 58 which determines the relative percentage of time auger motor 24 is powered while the circuit is completed. The percentage is varied using the control dial 76 seen in FIG. 2.

At one extreme, auger motor 24 is continuously on and preferably delivers 120 revolutions per minute which results in an ingredient throw of about 30 grams (number is highly dependent on the density of the ingredient) in approximately 10 seconds. Such an amount is typically used when blending a six ounce (6 oz.) cocoa drink mix. In contrast, coffee granules typically require only about 1.8 grams per six ounce (6 qz.) cup. Thus, the pulse width modulator would limit auger motor 24 to only an estimated six tenths (0.6) of a second of actual running time during an approximate 10 second liquid flow.

In mixing funnel 26, whip motor 30 drives whipping blade 28 to thoroughly mix ingredient 14 and liquid 12 thus produces the beverage dispensed through nozzle 16. Once reservoir 32 is emptied, the continuity is broken and auger motor 24 and whip motor 30 are de-energized and dump valve 64 closed by control board 58.

To use the automatic feature, a user, via keypad 56, selects selection two which is relayed to control board 58. Control board 58 in turn opens inlet valve 38 to allow liquid 12 to enter tank 34 from inlet source 36. At the same time, tank sensor probe 72 senses the temperature and electrical conductivity of liquid 12 and relays that information to control board 58. A water heater 77, seen in FIG. 3, is mounted to the bottom of tank 34 to maintain the water temperature as desired.

The amount of liquid 12 which enters tank 34 is controlled via a fill timer 74 rheostat shown in FIG. 2. Fill timer 74 includes a manual setting whereby water flows through inlet valve 38 as long as selection two is manually depressed on keypad 56. On the automatic setting, fill timer 74 may be adjusted to keep open valve 38 as long as desired. Tank 34 is preferably maintained full whereby opening valve 38 supplies water directly to mixing funnel 26 via tube 75. Thus, once selection two is touched, water is added automatically to mixing funnel 26 to the desired amount.

Using the information from probe 72, board 58 conditions the conductive sensitivity of sensor probe 31 located in mixing funnel 26. Once liquid 12 is in contact with conditioned sensor probe 31 and tank 34, electrical continuity is established between probe 31 and tank 34. The continuous circuit signals control board 58 which energizes whip motor 30 and auger motor 24 (for selection 2). Auger motor 24 drives auger 22 and thus delivers ingredient 14 from canister 20 to mixing funnel 26. Whip motor 30 drives whipping blade 28 to thoroughly mix ingredient 14 and liquid 12 thus produces the beverage dispensed through nozzle 16.

Once inlet valve 38 is closed and liquid 12 no longer flows, the circuit is broken and auger motor 24 and whip motor 30 are de-energized and inlet valve 38 closed by control board 58.

To use the hot water only feature of the dispenser, the user selects selection one. The selection one circuit is completed through control board 58 and energizes inlet valve 38. The user must maintain selection one to achieve the desired amount of hot water.

Although only certain embodiments of the invention have been illustrated and described, it will be apparent to those skilled in the art that various changes and modifications may be made therein without departing from the spirit of the invention or from the scope of the appended claims.

That which is claimed is:

1. A beverage dispenser for control of the delivery and mix of a liquid from its source with an ingredient, the dispenser comprising:

means for mixing the liquid and the ingredient, the mixer means being in electrical isolation from the source;

means for delivering the liquid from the source to the mixer means, the liquid providing a conductive path and thereby providing electrical continuity between the source and the mixer means during delivery;

a sensor for detecting the electrical continuity between the source and the mixer means, the sensor being in electrical communication with a control board;

means for delivering the ingredient to the mixer means, the ingredient delivery means being in electrical communication with the control board, the control board activating the ingredient delivery means when the sensor detects the electrical continuity.

2. The dispenser of claim 1 wherein the source of the liquid is a pour in reservoir.

3. The dispenser of claim 1 wherein the source of the liquid is a tank, the tank being connected to a water supply.

4. The dispenser of claim 1 wherein the ingredient delivery means is an auger, said auger being driven by an auger motor, said auger motor being in electrical communication with the control board.

5. The dispenser of claim 2 wherein the liquid delivery means is a dump valve.

6. The dispenser of claim 1 further comprising a liquid reference probe measuring the conductivity and temperature of the liquid in the source, said liquid reference probe being in electrical communication with the control board, said control board conditioning the sensor to the liquid.

7. The dispenser of claim 1 wherein the source of the liquid is a pour in reservoir, the dispenser further comprising a second source of the liquid and second means for delivering the liquid to the mixer means, said second means closing the electrical circuit, said second source comprising a tank, the tank being connected to a water supply.

8. The dispenser of claim 1 wherein the control board includes a pulse width modulator which controls the percentage of time the ingredient delivery means operates during electrical continuity.

9. The dispenser of claim 1 being in a tower configuration and further comprising a flat, plate mounted to the bottom of said tower for stability.

10. A beverage dispenser for control of the delivery and mix of a liquid from two sources with an ingredient, the dispenser comprising:

a pour in reservoir for receiving liquid poured therein being one of the two sources;

a tank in liquid communication with a water supply being the other of the two sources;

means for mixing the liquid and the ingredient;

means for delivering the liquid from either source to the mixer means, the liquid providing a conductive path and thereby providing electrical continuity between either source and the mixer means during delivery;

a sensor for detecting the electrical continuity between either source and the mixer means, the sensor being in electrical communication with a control board;

two liquid reference probes measuring the conductivity and temperature of the liquid in each of the sources, said liquid reference probes being in electrical communication with the control board, said control board conditioning the sensor to the liquid;

means for delivering the ingredient to the mixer means, the ingredient delivery means being in electrical communication with the control board, the control board activating the ingredient delivery means when the sensor detects the electrical continuity, the control board including a pulse width modulator which controls the percentage of time the ingredient delivery means operates during electrical continuity.

* * * * *